United States Patent [19]
Sage et al.

[11] Patent Number: 5,948,486
[45] Date of Patent: Sep. 7, 1999

[54] LIQUID CRYSTAL POLYMER DEVICES

[75] Inventors: Ian Charles Sage, Malvern; Mark Andrew Verrall, Poole; David Coates, Poole; Simon Greenfield, Poole, all of United Kingdom

[73] Assignee: The Secretary of State for Defence in Her Britannic Majesty's Government of the United Kingdom of Great Britain and Northern Ireland, United Kingdom

[21] Appl. No.: 08/817,306

[22] PCT Filed: Sep. 18, 1995

[86] PCT No.: PCT/GB95/02201

§ 371 Date: Apr. 7, 1997

§ 102(e) Date: Apr. 7, 1997

[87] PCT Pub. No.: WO96/12209

PCT Pub. Date: Apr. 25, 1996

[30] Foreign Application Priority Data

Oct. 13, 1994 [GB] United Kingdom ............... 9420632

[51] Int. Cl.$^6$ ............... C09K 19/38; G02F 1/1333
[52] U.S. Cl. ............... 428/1; 252/299.01; 349/86; 349/88; 349/92; 349/93; 349/183; 349/187; 349/189
[58] Field of Search ............ 349/183, 187, 349/189, 86, 88, 92, 93; 252/299.01; 428/1

[56] References Cited

U.S. PATENT DOCUMENTS

| | | | |
|---|---|---|---|
| 4,702,558 | 10/1987 | Coles et al. | 252/299.1 |
| 5,329,034 | 7/1994 | Nagase et al. | 556/415 |
| 5,498,366 | 3/1996 | McDonnell et al. | 252/299.6 |
| 5,641,426 | 6/1997 | Nerad et al. | 252/299.01 |

FOREIGN PATENT DOCUMENTS 0586014  3/1994  European Pat. Off. .

OTHER PUBLICATIONS

P. LeBarny et al, "The chiral smectic C liquid crystal side chain polymers," 130, 155, in C B McArdle, ed., "Side chain Liquid Crystal Polymers," Blackie, Glasgow, 1989.

Pat. Absts. Japan vol. 11, No. 189 (P. –587), abstr. of JPA–62–015,501.

*Primary Examiner*—Donald R. Wilson
*Attorney, Agent, or Firm*—Nixon & Vanderhye

[57] ABSTRACT

A method for the loading and alignment of liquid crystal polymers in electro-optic and electro-active devices by in-situ polymerization between substrates of liquid crystal monomers. The molecular weight of the resulting liquid crystal polymer is controlled by the addition of a chain transfer reagent, for example, a thiol-containing compound which may be a liquid crystal material.

23 Claims, 4 Drawing Sheets compound I

LIQUID CRYSTAL POLYMER DEVICES

This invention relates to the alignment of liquid crystal polymers in liquid crystal devices.

The unit that is the basic building block of a polymer is called a monomer.

The polymerisation process i.e. the formation of a polymer from its constituent monomers does not usually create polymers of uniform molecular weight, rather what is created is a distribution of molecular weights. In order to describe a sample of polymer it is necessary to state the average number of monomers in a polymer, this is called the degree of polymerisation (D.P.). By how much the majority of polymer molecules differ from this average value (or to describe the spread of molecular weight) is called the polydispersity.

A number of different average molecular weights can be drawn from gel permeation chromatography (GPC) for a given sample including: Mn—number average molecular weight and Mw—weight average molecular weight. The value used to calculate D.P. is usually Mn and polydispersity is usually defined as Mw/Mn.

Polymers can be made from different types of monomers, in which case the polymer is called a co-polymer. If two types of monomer join in a random fashion then the polymer is called a random co-polymer. If the two monomers form short sequences of one type first which then combine to form the final polymer then a block copolymer results. If short sequences of one of the monomers attach themselves as side chains to long sequences consisting of the other type of monomer then the polymer is referred to as a graft copolymer.

In liquid crystal polymers the monomers can be attached together in essentially two ways. The liquid crystal part or mesogenic unit of the polymer may be part of the polymer backbone resulting in a main chain polymer, alternatively the mesogenic unit may be attached to the polymer backbone as a pendant group i.e. extending away from the polymer backbone, this results in a side-chain polymer. These different types of polymer liquid crystal are represented schematically below. The mesogenic units are depicted by the rectangles.

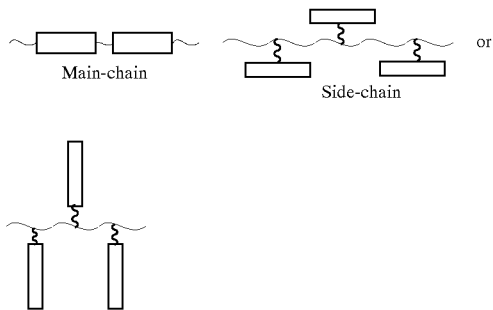

The side chain liquid crystal polymer can generally be thought of as containing a flexible polymer with rigid segments (the mesozenic unit) attached along its length by short flexible (or rigid) units as depicted in the schematic representation below. It is the anisotropic, rigid section of the mesogenic units that display orientational order in the liquid crystal phases. In order to affect the phases exhibited by the liquid crystal and the subsequent optical properties there are many features which can be altered, some of these features are particularly pertinent to side-chain liquid crystal polymers. One of these features is the flexible part that joins the mesogenic unit to the polymer backbone which is generally referred to as a spacer; the length of this spacer can be altered, its flexibility can also be altered.

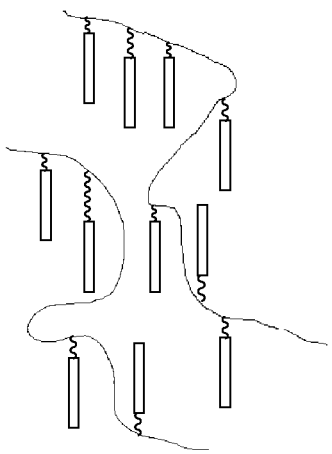

A number of side-chain liquid crystal polymers are known, for example see GB 2146787 A.

Liquid crystal polyacrylates are known class of liquid crystal polymer (LCP). LCPs are known and used in electro-optic applications, for example in pyroelectric devices, non-linear optical devices and optical storage devices. For example see GB 2146787 and Makromol. Chem. (1985), 186 2639–47.

Side-chain liquid crystal polyacrylates are described in Polymer Communications (1988), 24, 364–365 e.g. of formula:

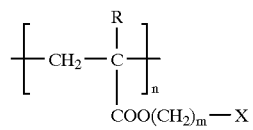

where $(CH_2)_m$—X is the side-chain mesogenic unit and R is hydrogen or alkyl.

Side-chain liquid crystal polychloroacrylates are described in Makromol. Chem. Rapid Commun. (1984), 5, 393–398 e.g. of formula:

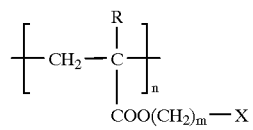

where R is chlorine.

A method for the preparation of polyacrylates homo- or co-polymers having the following repeat unit is described in UK patent application GB 9203730.8

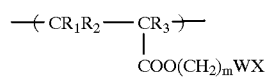

$R_1$ and $R_2$ are independently alkyl or hydrogen. $R_3$ is alkyl, hydrogen or chlorine. m is O or an integer 1–20. W is a linkage group COO or OOC. O and X is a mesogenic group.

One of the main problems with polymer liquid crystals is that they are extremely difficult to align in devices. Essentially there are two techniques which have been used for aligning polymer liquid crystals. It is possible to try to align the liquid crystal polymer in a similar manner as a low molar mass liquid crystals which is described in more detail below. Alteratively, mechanical techniques can be used such as shearing. Typically mechanical shearing is performed over hot rollers this technique is generally only suitable for flexible substrates. It is possible to shear a sample between glass slides however the glass slides cannot be sealed in the conventional manner.

Materials and Assembling Process of LCDs by Morozumi in Liquid Crystals Applications and uses, vol 1 Ed. Bahadur, World Scientific Publishing Co. Pte. Ltd. 1990 pp 171–194 and references therein as the title suggests discusses methods for assembling liquid crystal devices.

The technique for aligning low molar mass liquid crystals is typically as follows. Transparent electrodes are fabricated on the surfaces of the substrates, the substrates typically being made of glass e.g. glass slides. In twisted nematic or super twisted nematic devices, for example, an alignment process is necessary for both substrates. A thin alignment layer is deposited to align the liquid crystal molecules, typically either organic or inorganic aligning layers are used, for example SiO deposited by evaporation is a typical inorganic alignment layer. One method to form the alignment layer involves rubbing the surface by textures or cloths. Polyimides have also been employed for the surface alignment layers. Polymide is coated onto the substrates bearing electrodes by a spinner and then cured to form a layer of approximately 50 nm thickness. Then each layer surface is repeatedly rubbed in substantially one direction with an appropriate material. If the liquid crystal molecules are deposited on this layer they are automatically aligned in the direction made by the rubbing. It is often preferable if the molecules possess a small angle pre-tilt typically 2–3°. Higher pre-tilts are sometimes required.

The two substrates are then fixed together for example by adhesive and are kept separate by spacing materials. This results in uniform and accurate cell spacing. A typical adhesive is an epoxy resin. This sealing material is usually then precured. The electrodes may then be precisely aligned for example to form display pixels. The cell is then cured at, for example 100–150° C. At this point the empty liquid crystal cell is complete.

It is at this point that the cell is filled with liquid crystal material. The opening size in the sealing area of the liquid crystal cell is rather small therefore the cell can be evacuated, for example in a vacuum chamber, and the liquid crystal forced into the cell via gas pressure. More than one hole in the sealing area may be used. The empty cell is put into a vacuum chamber and then the vacuum chamber is pumped down. After the cell has been evacuated the open region of the sealant is dipped into the liquid crystal material and the vacuum chamber is brought back to normal pressure. Liquid crystal material is drawn into the cell as a result of capillary action, external gases can be applied to increase the pressure. When the filling process is complete the hole or holes in the sealant is/are capped and the cell is cured at a temperature above the liquid crystal material clearing point to make the liquid crystal molecular alignment stable and harden the capping material.

Polymer liquid crystal molecules tend to be more viscous than low molecular weight liquid crystal materials and are therefore more difficult to align and more difficult to fill into devices. Only liquid crystal polymers with low molecular weights can be flow filled into a cell, and once a degree of polymerisation greater than around 30 or 40 repeat units is reached, most liquid crystal polymers become so viscous that flow filling cells is extremely difficult. Much slower cooling is needed in order to try and align liquid crystal polymers and this usually results in poor uniformity of alignment.

Poorly aligned liquid crystal molecules do not result in the fast switching high contrast materials and devices that are generally required.

The above techniques are suitable for many liquid crystal materials including those devices which use liquid crystal materials which exhibit and utilise the smectic mesophase e.g. ferroelectrics. Suitable alignment techniques may also be found in GB 2210469 B.

Devices containing ferroelectric liquid crystal mixtures can exhibit fast switching times (faster than 100 $\mu$s). Clark and Lagerwall, Appl. Phys. Lett., 36, 89, 1980. They can be bistable which means that they can be multiplexed at high levels using a line-at-a-time scan technique. Ferroelectric materials continue to receive a large amount of investigative attention due to their application in high resolution flat panel displays. An important feature of devices containing liquid crystalline materials is that they should exhibit a fast response time. The response time is dependent on a number of factors, one of these being the spontaneous polarisation, denoted Ps (measured in nC cm$^{-2}$). By adding a chiral dopant to the liquid crystalline mixture the value of Ps can be increased, thus decreasing the response time of the device. Ferroelectric smectic liquid crystal materials, which can be produced by mixing an achiral host and a chiral dopant, use the ferroelectric properties of the tilted chiral smectic C, F, G, H, I, J, and K phases. The chiral smectic C phase is denoted $S_C^*$ with the asterisk denoting chirality. The $S_C^*$ phase is generally considered to be the most useful as it is the fastest switching. It is desirable that the material should exhibit a nematic (denoted N) and $S_A$ phase at temperatures above the chiral smectic phase in order to assist surface alignment in a device containing liquid crystalline material. Ferroelectric smectic liquid crystal materials should ideally possess the following characteristics: low viscosity controllable Ps and an $S_C^*$ phase that persists over a a broad temperature range which should include ambient temperature, and exhibits chemical and photochemical stability. Materials which possess these characteristics offer the prospect of very fast switching liquid crystal containing devices.

Ferroelectric LCDs by Dijon in Liquid Crystals Applications and Uses, vol. 1 Ed. Bahadur, World Scientific Publishing Co. Pte. Ltd. 1990 pp 350–360 and references therein discusses alignment processes for smectic phases for low molar mass materials. The filling of cells is believed to be possible only in the isotropic or nematic phase due to the viscosity of smectic phases. Generally materials with the following phase sequence give good alignment:

whereas materials with the following phase sequences are more difficult to align:

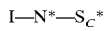

Typically, therefore, in order to use a liquid crystal material in the smectic phase it will involve heating the material to the nematic or isotropic phase and allowing it to cool slowly into an aligned smectic state. Should this technique be applied to a polymer liquid crystal material then the cooling time is usually very much longer in order to assist the alignment, though very often the alignment is poor.

EP-A-0 586014 discloses methods of making electro-optic devices which exhibit improved resistance to shock damage via the use of polymer networks. The method comprises the in-situ polymerisation of monomeric materials. A similar method is also disclosed in JP-A-2116824—this method incorporating a chain transfer agent as an arbitrary agent. JP-A 62015501 discloses methods of making flexible polymer films for use in optical filters.

This invention solves the above problems by the in-situ polymerisation of liquid crystal material in the presence of a thiol-containing chain transfer reagent.

According to this invention a method of making an electro-optic device comprises the steps;

forming a cell comprising two cell walls spaced apart, the walls inner surfaces having formed thereon electrode structures, providing a free radical polymerizable monomer material, introducing the monomer material between the cell walls, polymerising the monomer.

According to a further aspect of this invention the molecular weight of the final polymer liquid crystal may be controlled by the addition of a chain transfer reagent to the monomer material.

Preferably at least one wall is surface treated to provide liquid crystal alignment.

Preferably a photoinitiator or a thermal initiator is added to the monomer material.

Preferably the chain transfer reagent is one or more compounds containing at least one thiol group.

Preferably the structure of the chain transfer reagent is closely related to the structure of the monomer material.

The monomer material may be aligned before polymerisation and/or the polymer may be aligned after polymerisation. The monomer may be present in any of the known liquid crystal phases including nematic, cholesteric or smectic.

Preferably the polymerisation is carried out under UV light and/or in the presence of additional heat.

The cell walls may be substantially rigid or at least one of them may be substantially flexible; such a cell may be used to manufacture a thin layer of liquid crystal polymer, e.g. a smectic liquid crystal polymer. In this method the electrodes are not necessary however the cell walls may carry electrode layers allowing an electric field to be applied before, during and/or after the polymerisation. An aligned layer of liquid crystal polymer is produced as above. At least one of the substantially flexible cell walls is removed, e.g. by peeling away from the aligned polymer layer. If required, electrodes can be formed on at least one of the layers in particular on at least one surface of the polymer layers; for example the electrodes may be made from Indium Tin Oxide, Aluminium or Gold. Electrodes may also be constructed from conducting polymer or a combination of the above. The electrodes may or may not be transparent. The layer or layer and electrodes may be mounted onto one support or between supports. Such a method may be useful in producing pyroelectric, piezoelectric and other electro-active devices, for example sensors.

The invention will now be described by way of example only with reference to the following diagrams:

Figure 1:
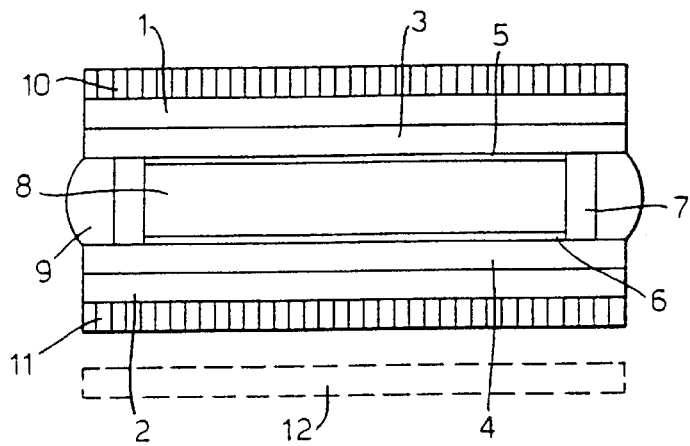
FIG. 1 is a representation of a liquid crystal cell containing a mixture described by the current invention.

An example of the use of a material and device embodying the present invention will now be described with reference to FIG. 1.

The liquid crystal device consists of two transparent plates, 1 and 2, for example made from glass. These plates are coated on their internal face with transparent conducting electrodes 3 and 4. An alignment layer is introduced onto the internal faces of the cell so that a planar orientation of the molecules making up the liquid crystalline material will be approximately parallel to the glass plates 1 and 2. This is done by coating the glass plates 1, 2 complete with conducting electrodes 3, 4 with layers of film 5 and 6 of a suitable polymer eg polyimide. The electrodes 3, 4 may be formed into row and column electrodes so that the intersections between each column and row form an x,y matrix of addressable elements or pixels. Prior to the construction of the cell the films 5, 6 are rubbed with a roller covered in cloth (for example made from velvet) in a given direction, the rubbing directions being arranged parallel (same or opposite direction) upon construction of the cell. A spacer 7 eg of polymethyl methacrylate separates the glass plates 1 and 2 to a suitable distance eg 2 microns. Liquid crystal material 8 is introduced between glass plates 1, 2 by filling the space in between them. This may be done by flow filling the cell using standard techniques. The spacer 7 is sealed with an adhesive 9 in a vacuum using an existing technique. Polarisers 10, 11 may be arranged in front of and behind the cell.

Alignment layers may be introduced onto one or more of the cell walls by one or more of the standard surface treatment techniques such as rubbing, oblique evaporation or as described above by the use of polymer aligning layers.

The device may operate in a transmissive or reflective mode. In the former, light passing through the device, eg from a tungsten bulb, is selectively transmitted or blocked to form the desired display. In the reflective mode a mirror, or diffuse reflector, (12) is placed behind the second polariser 11 to reflect ambient light back through the cell and two polarisers. By making the mirror partly reflecting the device may be operated both in a transmissive and reflective mode.

In an alternative embodiment a single polariser and dye material may be combined.

The liquid crystal material 8 when introduced into the cell consists of liquid crystal monomers. It may also contain a reagent which will limit the molecular weight of the polymer for example a chain transfer reagent and it may also include a photoinitiator and/or thermal initiator.

The monomer material may be aligned before polymerisation using standard techniques, for example by heating up to and cooling from the isotropic phase or from a liquid crystal phase such as a nematic or chiral nematic phase. It is also possible that the liquid crystal polymer may be aligned by one or more techniques including the use of surface forces, shear alignment or field alignment.

It is possible that following polymerisation there may still be some amount of monomer material remaining. This may be unreacted monomer or low molar mass additives which do not bear polymerisable groups.

Typically, reagents which may be used to limit the molecular weight of the polymer possess one or more thiol groups. These may be low molecular weight materials which may or may not exhibit liquid crystalline behaviour or they may be more complex molecules, in particular they may possess similar structures to the monomer which will be the basic building block for the liquid crystal polymer material.

Polymerisation may be carried out by using any of the known techniques. For example the monomer material or monomer material plus chain transfer reagent may also contain a photoinitiator and be exposed to UV light, in addition to exposing such samples to UV light, heat may also be applied to assist the polymerisation reaction. Heat may be applied to permit polymerisation within a given phase of the monomer and/or polymer.

Alternatively the polymerisation process may take place in the presence of heat and a thermal initiator. However if this technique is used it is preferable if it is carried out at a temperature which corresponds to a liquid crystal phase of the monomer material.

EXAMPLE 1 liquid crystal monomer:

Samples were placed between microscope slides and after approximately ten minutes exposure to UV the slides were separated and the polymer material scraped off and analysed by GPC. The figures in Table 1 below refer to the polymer material which was soluble in THF:

TABLE 1

| Sample | Thiol/mol % | unreacted monomer/% | Mn | Mw/Mn | DP |
|---|---|---|---|---|---|
| 1 | 0.0 | 25 | 35.400 | 7.5 | 54* |
| 2 | 0.65 | 20 | 36.300 | 2.86 | 55 |
| 3 | 1.3 | 52 | 32.000 | 1.99 | 48 |
| 4 | 2.61 | 58 | 18.800 | 1.66 | 28 |

*this sample was only partially soluble in THF.

A further set of experiments were carried out using a more powerful, low pressure Hg arc lamp (500 mW/cm$^2$). The internal temperature within this lamp was typically in the range 60–80° C. The samples were heated to approximately 80° C. and then rapidly passed under the UV lamp five times on a chain belt giving a total exposure time of approximately 5 seconds. The resulting polymers were scraped from the slides and analysed by GPC. The results are contained in Table 2.

TABLE 2

| Sample | Thiol/mol % | unreacted monomer/% | Mn | Mw/Mn | DP |
|---|---|---|---|---|---|
| 1 | 0.0 | | insoluble in THF | | v. high |
| 2 | 0.65 | 2 | 37.800 | 3.57 | 57 |
| 3 | 1.3 | 1 | 28.400 | 2.25 | 43 |
| 4 | 2.6 | 2 | 19.100 | 1.76 | 29 |
| 5 | 6.4 | 2 | 12.100 | 1.52 | 18 |
| 6 | 13.1 | <1 | 7.990 | 1.80 | 12 |
| 7 | 29.1 | <1 | 3.760 | 1.63 | 6 |

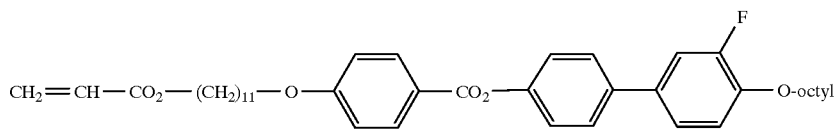

chain transfer reagent: $C_{12}H_{25}SH$.

Figure 3:
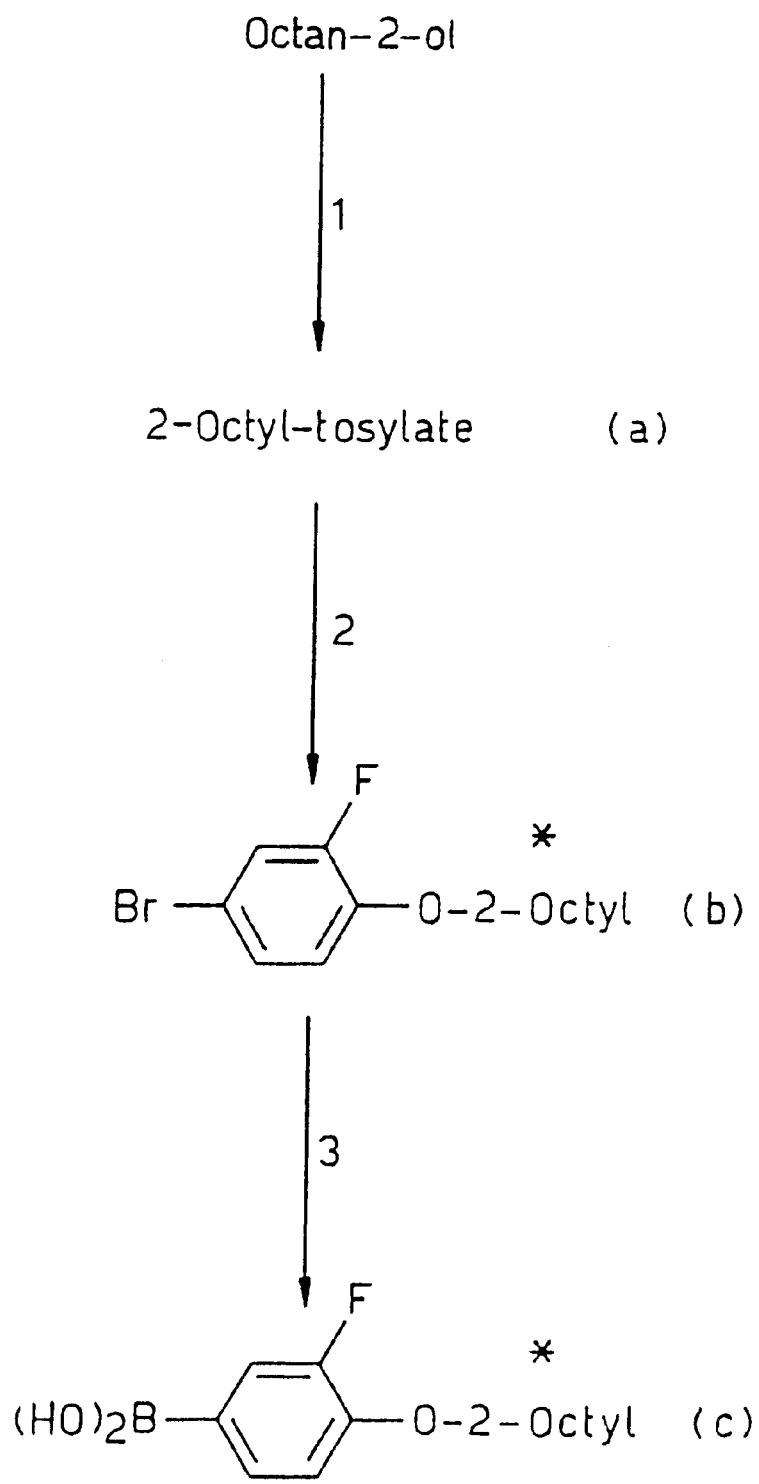
FIG. 3 is a synthetic scheme for the preparation of intermediate (c).
Figure 4:
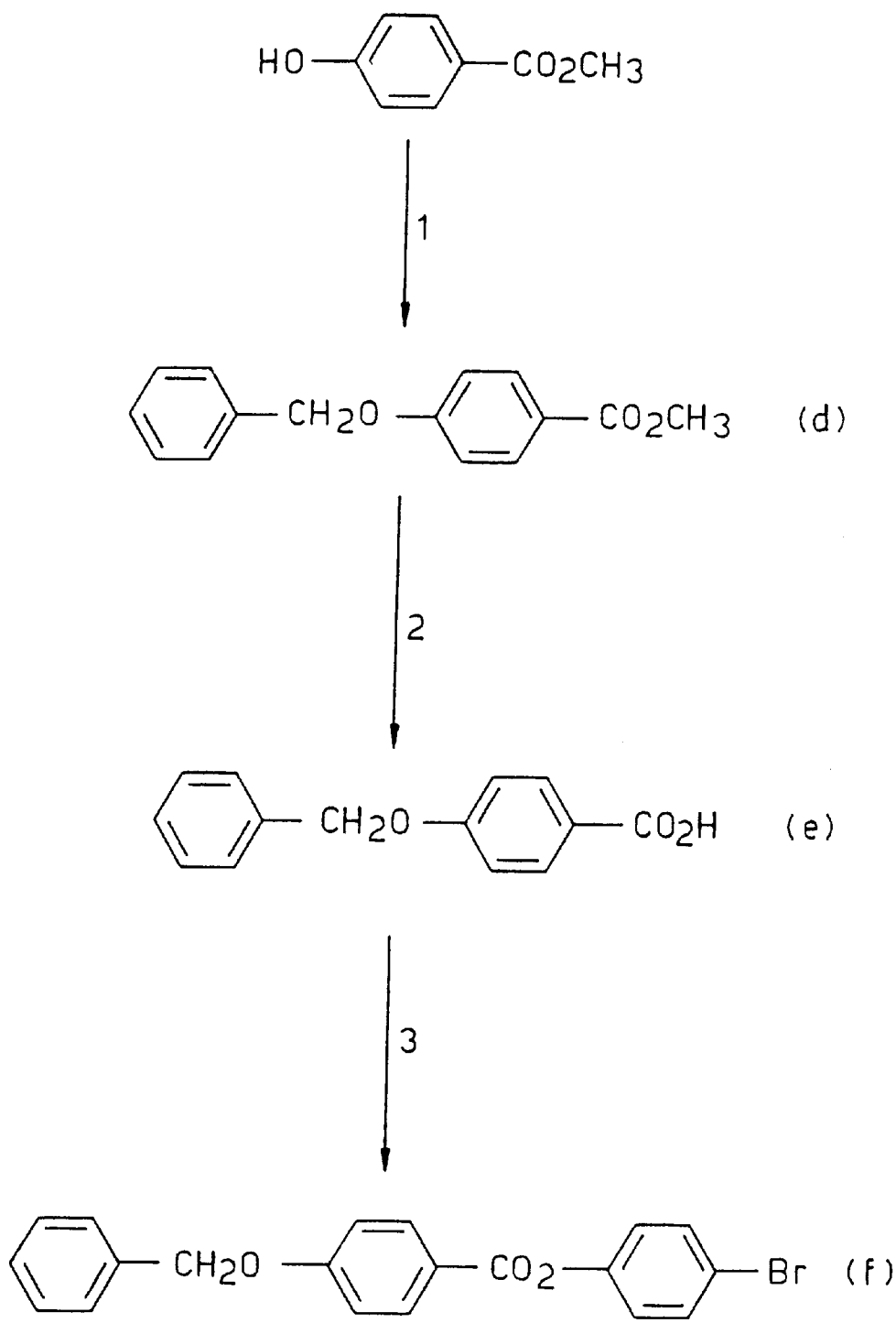
FIG. 4 is a synthetic scheme for the preparation of intermediate (f).
Figure 5:
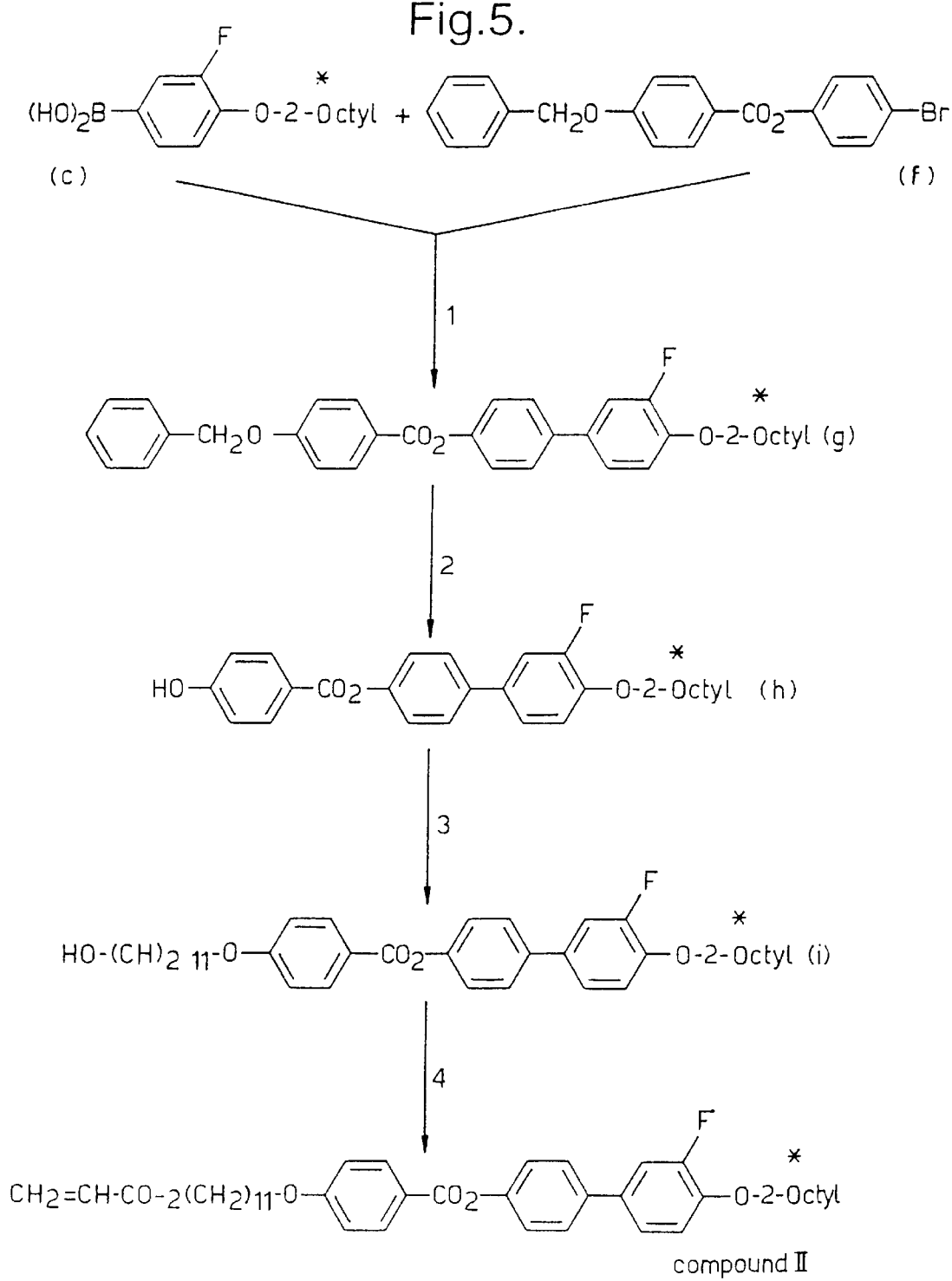
FIG. 5 is a synthetic scheme for the preparation of acrylate monomer compound II.

The monomer was synthesised using the methods outlined in FIGS. 3, 4 and 5. Polymerisation of the relevant monomer was carried out using Heraus Sun-Test apparatus (low power Xenon lamp), on a hotplate thermostatted at 80° C. (the monomer has a melting point of 71° C.) and using 1% (w/w) Darocur 1173 as the initiator. The effect of varying quantities of the thiol material were assessed.

For the results quoted in Tables 1 and 2, the polymerisation using a non-liquid crystalline thiol monomer resulted in some phase separation of the liquid crystal polymer from the thiol. This appeared to be dependent on curing temperature and if the polymerisation was carried out above the clearing point of the liquid crystal polymer, phase separation was substantially reduced.

The following material was synthesised:

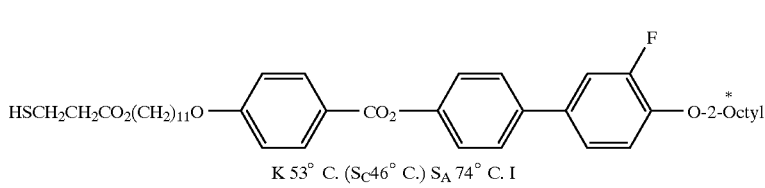

Compound I

K 53° C. (S<sub>C</sub>46° C.) S<sub>A</sub> 74° C. I

Figure 2:
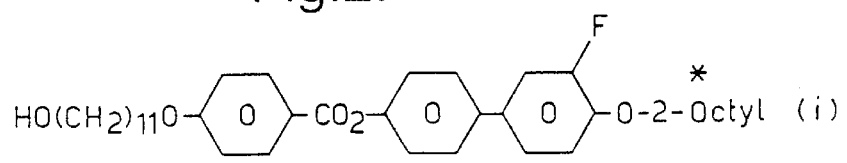
FIG. 2 is a synthetic scheme for the preparation of thiol compound I.
Figure 2:
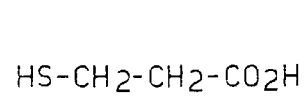
Figure 2:
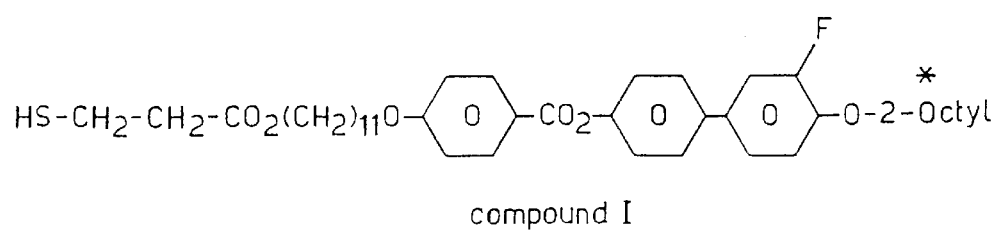

The synthetic scheme for the preparation of this thiol material is shown in FIG. 2.

Three different methods were assessed for the preparation of this material.

Method 1

DCC/DMAP in DCM;

RT stir 24 hours (approx 20% conversion);

Refluxed gently 18 hours (approx 40% product with 12% byproduct).

Method 2 toluene-4- sulphonic acid in toluene, reflux 24 hours;

52% product, 5% starting material+34% byproducts (+others).

Method 3 toulene-4-sulphonic acid in DCM, reflux 48 hours;

72% product, 9% SM+byproducts (5%+others);

columned to 99.5% (hplc) 1.8 g (48% yield).

DCC=dicyclohexylcarbodiimide, DMAP=N,N-dimethylaminopyridine, DCM=dichloromethane, RT=room temperature, SM=starting material.

The thiol (compound I, approximately 10%) was mixed with the acrylate monomer (compound II below):

Preparation of intermediate (a): FIG. 3, step 1

R-(−)-2-Octanol (50.0 g, 0.385 mol) and tosyl chloride (87.9 g, 0.461 mol) were stirred in dichloromethane (300 ml) in a bath of ice and acetone. To this was added dropwise, whilst stirring, pyridine (37.3 ml, 0.462 mol.) ensuring that the temperature did not exceed 0° C. When all of the pyridine had been added, the mixture was stirred for 18 h whilst allowing the temperature to rise to room temperature. The product was purified by column chromatography on silica using petrol as eluent. Yield=48 g (44 % yield). Purity=97.2% (g.c.). $\lambda_{max}$(hplc)=224 nm.

Preparation of intermediate (b): FIG. 3, step 2.

Intermediate (a) (32.7 g, 0.115 mol.), 4-bromo-2-fluorophenol (24.1 g, 0.126 mol.) and potassium carbonate (31.8 g, 0.230 mol.) were combined in butanone (250 ml) and heated under reflux gently in a nitrogen atmosphere for 24 h. After allowing the reaction mixture to cool to room temperature, water (400 ml) was added and shaken with the mixture. The aqueous layer was separated and extracted with ether (2×250 ml). This organic layer was combined with the original organic solution, washed with water (2×200 ml) dried over anhydrous sodium sulphate and the solvent removed on a rotary evaporator. The crude product (purity (gc)=72.6%) was purified by column chromatography on silica using petrol as eluent. Yield 29.1 g (84% yield). Purity=98.0% (hplc), 95.0% (gc). $\lambda_{max}$ (hplc)=226 nm.

Preparation of intermediate (c): FIG. 3, step 3

Magnesium (5.2 g, 0.217 mol.) in tetrahydrofuran (10 ml) was stirred in a nitrogen atmosphere. Intermediate (b) was

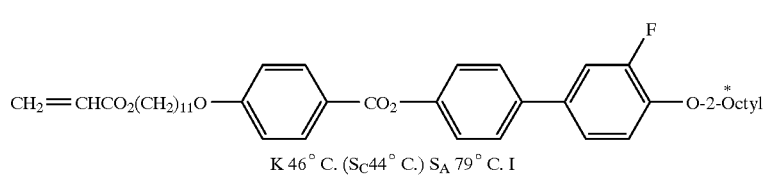

Compound II

K 46° C. (S<sub>C</sub>44° C.) S<sub>A</sub> 79° C. I

The synthetic scheme for the preparation of compound II is shown in FIGS. 3, 4 and 5.

Analysis of purity was carried out using a Hewlett Packard HPLC 1090 with a Merck RP18 5 μm column eluted with graduated mixtures of acetonitrile/water, and with a Perkin Elmer GC 8500. Molecular weight data of polymers were determined by gel permeation chromatography on a Polymer Laboratories 10 μm and Merck Lichrogel PS400 10 μm column in series, eluted with tetrahydrofuran and calibrated against Polymer Laboratories standards with molecular weights ranging from Mp=1,060 to 3,040,000. Thermal analysis was carried out using a Perkin Elmer DSC7.

The silica gel used for column chromatography was standard grade BDH silica gel (particle size 0.13–0.25 mm for gravity columns, and Merck silica (0.040–0.063 mm) for flash chromatography. Petrol used for chromatography was BDH GPR petroleum spirit boiling range 40–60° C.

dissolved in a tetrahydrofuran (100 ml) and a little of this solution added to the magnesium in tetrahydrofuran. A single crystal of iodine was added and the mixture was warmed to a gentle reflux. Once the solution had begun to turn grey-blue in colour, the heat was removed and the remaining bromobenzene in tetrahydrofuran was added dropwise at a sufficient rate that the exothermic reaction supported continuous reflux of the reaction mixture. When the addition was complete, the heating was continued to support gentle reflux for a further two hours. The reaction mixture was cooled in ice and trimethylborate (22.5 g, 0.216 mol.) in tetrahydrofuran 20 ml) was added slowly whilst stirring, and the mixture stirred for another half hour at 0–5° C. Hydrochloric acid (20% aqueous solution, 95 ml) was added carefully and stirred well for about fifteen minutes. The product was extracted into diethyl ether (200 ml) and shaken with water (2×100 ml). The ether layer was dried over anhydrous sodium sulphate and the solvent removed on a rotary evaporator. Yield=43.3 g (90% yield). Purity=46.5% plus 38.0% boronic acid (hplc).

Preparation of intermediate (d): FIG. 4, step 1

Benzyl chloride (229 g, 1.81 mol.) methyl-4-hydroxybenzoate (250 g, 1.65 mol) potassium carbonate (340 g, 2.46 mol and butanone (1,200 ml.) were combined and gently heated under reflux for 48 h. After allowing to cool, the solid was filtered off and washed with butanone (3×200 ml). The combined butanone fractions were reduced on a rotary evaporator to an off white solid which was dissolved in dichloromethane (700 ml), washed with water (3×300 ml), dried over anhydrous sodium sulphate and the solvent removed on a rotary evaporator. Yield=395 g (98.9% yield). Purity=99.3% (hplc). $\lambda_{max}$(hplc)=254 nm.

Preparation of intermediate (e): FIG. 4, step 2

Intermediate (d) (395 g, 1.64 mol.), potassium hydroxide (184 g, 3.28 mol.) industrial methylated spirit (1,000 ml) and water (1,300 ml) were combined and gently heated under reflux for 3 h (reaction was monitored by tlc). After allowing to cool, the reaction mixture was added to cold water (1500 ml) and acidified to pH 2–5 with concentrated hydrochloric acid. The product precipitated out and was filtered off before recrystallisation from hot ethanol. Yield=265 g. Purity=99.7% (hplc)

Preparation of intermediate (f): FIG. 4, step 3

Intermediate (e) (45 g, 0.20 mol.) and 4-bromophenol (31 g, 0.18 mol.) were combined with dichloromethane (1000 ml) and stirred at room temperature whilst trifluoroacetic anhydride (38 ml, 0.27 mol) was added slowly. The mixture was stirred for 24 h, washed with sodium hydrogen carbonate (5% solution, 2×1000 ml) and water (1000 ml) before drying over anhydrous sodium sulphate and removing the solvent on a rotary evaporator. The crude product was recrystallised from ethanol. Yield=46 g (67% yield). Purity=98.2% (hplc).

Preparation of intermediate (g): FIG. 5, step 1

Intermediate (f) (13.0 g, 0.034 mol.) was dissolved in toluene (90 ml) and tetrakis (triphenylphosphine) palladium (0) (0.1 g, catalytic) was added whilst stirring in a nitrogen atmosphere. Sodium carbonate (2 M solution, 45 ml) was then added followed by intermediate (c) (10.0 g 0.037 mol.) in IMS (25 ml) and the mixture heated under reflux in a nitrogen atmosphere for 48 h. After allowing to cool, water (200 ml) was added and the product separated into toluene (200 ml). The organic layer was washed with water (2×100 ml), dried over anhydrous sodium sulphate and the solvent removed on a rotary evaporator. The crude product was recrystallised from ethanol. Yield=11.3 g (63% yield). Purity 97.5% (hplc), $\lambda_{max}$(hplc)=268 nm.

Preparation of intermediate (h): FIG. 5, step 2

Intermediate (g) (11.3 g, 0.0215 mol.) was dissolved in ethyl acetate (200 ml) in a 500 ml flask and 5% palladium on charcoal (0.6 g, catalytic) in ethyl acetate (5 ml) was added. The vessel was evacuated and flushed with argon three times, and then evacuated and flushed with hydrogen. The mixture was then stirred vigorously under hydrogen for 48 h. The catalyst was filtered off and the solvent removed on a rotary evaporator. Yield=8.2 g, (89% yield). Purity=97.8% (hplc). $\lambda_{max}$(hplc)=268 nm.

Preparation of intermediate (i): FIG. 5, step 3

Intermediate (h) (6.0 g, 0.014 mol.) was combined with 11-bromoundecan-1-ol (3.8 g, 0.015 mol.), potassium carbonate (3.8 g, 0.028 mol.) and butanone 40 ml, and gently heated under reflux whilst stirring for 20 h. When cool, water (30 ml) was added, the mixture stirred briefly and layers separated. The aqueous layer was extracted with dichloromethane (2×20 ml), the dichlororomethane layers combined with the butanone layer and washed again with water (20 ml) before drying over anhydrous sodium sulphate and removing the solvent on a rotary evaporator. The product was recrystallised from ethanol and then flash columned on silica eluting with 30% dichloromethane in petrol. Yield=4.2 g (51%). Purity=98.7%, $\lambda_{max}$(hplc)=268 nm.

Preparation of monomer compound II: FIG. 5, step 4

Intermediate (i) was combined in a 50 ml flask with acryloyl chloride (0.72 g, 0.0079 mol) and dichloromethane (25 ml) and stirred at room temperature whilst adding dropwise triethylamine (2 ml). A calcium chloride drying tube was fitted and the mixture stirred at room temperature for 18 h. The mixture was diluted with further dichloromethane (30 ml) and washed with hydrochloric acid (10% aqueous solution, 30 ml) and water (2×30 ml), dried over anhydrous sodium sulphate and the solvent removed on a rotary evaporator. The product was purified by flash column chromatography on silica, using dichloromethane/petrol (1:1) as eluent. Yield=2.7 g. Purity=96.9% (hplc). $\lambda_{max}$ (hplc)=268 nm.

Polymerisation of compound II in solution.

All glassware used in the following preparation was first dried thoroughly in a hot oven (110° C.). Monomer (II) (1.0 g) was dissolved in dry 1,2-dichloromethane (20 ml) and the free radical initiator azoisobutyronitrile (0.01 g) was added. The vessel was evacuated and flushed with nitrogen three times before stirring the mixture in a static nitrogen atmosphere in an oil bath at 60° C. for 48 h. After allowing to cool, the mixture was poured into cold ethanol (0–5° C.) and an off-white solid precipitated. The solid was filtered off dissolved in a little dichloromethane (5 ml) and poured again into cold ethanol. The polymer was examined for residual monomer by gel permeation chromatography and this process of reprecipitation repeated until no monomer remained in the sample. Yield=0.56 g (56% yield). No monomer was detectable by GPC.

Alternative method for the preparation of intermediate (b)

4-brome-2-fluorophenol (27.9 g) was combined with (–)-2-octanol (20.0 g) and diethylazodicarboxylate (25.4 g) and dissolved in tetrahydrofuran (200 ml). Triphenylphosphine (38.2 g) was taken up in THF (100 ml) and added slowly, whilst keeping the reaction mixture cool in an ice bath. The mixture was stirred at room temperature for 24 h under an atmosphere of nitrogen. The THF was removed on a rotary evaporator, the products taken up in dichloromethane (250 ml), washed with water (2×150 ml), the solution dried over anhydrous sodium sulphate and the solvent removed on a rotary evaporator. The crude product was purified by flash chromatography on silica using petrol as eluent. Yield 24.3 g (55% yield). Purity 96.50% (hplc). 96.7% (gc).

Compounds I and II were photopolymerised under the following conditions:

Mixture acrylate monomer (compound II), thiol (compound 1),

Darocur 1173 1% (w/w).

This mixture was flow filled into 2 μm cells at 85° C. (isotropic phase), cured under mercury arc lamp (500 mW/cm$^{-2}$), exposure time approx 5 seconds, temperature of curing>60° C.

The physical properties of a typical sample prepared using this method are compared to a typical sample polymerised in solution.

TABLE 3

| Polymerisation method | Mn | Mw/Mn | DP | Thermal Behaviour/° C. |
|---|---|---|---|---|
| Solution Polymerised | 9610 | 1.31 | 14 | g 11 $S_1$ 53 $S_C$ 134 $S_A$ 147 I |
| UV cure + 10% thiol | 8750 | 1.41 | 13 | g 27 $S_?$ 53 $S_C$ 120 $S_A$ 138 I |

The temperatures obtained above are from microscopy techniques, except glass transition temperatures which were measured by DSC.

The two samples from Table 3 were studied in 2 μm cells. The two samples displayed the same four ranges of switching behaviour when a triangular wave of +/− 20 V μm$^{-1}$ was applied, as follows:

TABLE 4

| | Temperature range/° C. | |
|---|---|---|
| Electro-optic response | Solution polymerised | UV cure + 10% thiol |
| No switching observed | up to 55 | up to 60 |
| Electroclinic - contrast increases with increasing temperature | 55–105 | 60–106 |
| 3-state 'anti-ferroelectric'-like switching with excellent alignment and high contrast (total switching angle 45°) | 105–120 | 106–119 |
| Electroclinic - contrast increases with increasing temperature up to clearing point | 120–145 | 119–138 |

Table 5 shows the effect of varing the amount of chain transfer reagent. For the results in Table 5 the acrylate monomer II was mixed with the thiol transfer agent I in various percentages together with the photoinitiator (Darocur 1173, 1 wt %). The monomeric mixtures were flow filled in the isotropic phase (85° C.) into approximately 2.5 μm cells and then cured at controlled temperature under a UV lamp (Dr. Hönle 400 F).

TABLE 5

| Thiol/wt. % Compound II | Mn | Mw/Mn | D.P. | Phase Behaviour/° C. |
|---|---|---|---|---|
| 2.0 | 26700 | 1.91 | 40 | $S_1$ 61 $S_C$ 150 $S_A$ 158 I |
| 2.7 | 22400 | 1.60 | 34 | $S_1$ 61 $S_C$ 141 $S_A$ 155 I |
| 4.8 | 16000 | 1.51 | 24 | $S_1$ 58 $S_C$ 137 $S_A$ 153 I |
| 10.8 | 8750 | 1.41 | 13 | $S_1$ 53 $S_C$ 120 $S_A$ 138 I |

There are a number of variables which may affect the photopolymerisation of liquid crystal monomers. These include the following:

1/ Exposure time to UV source,
2/ Phase of monomers and polymer (i.e. temperature of curing),
3/ Concentration of initiator,
4/ Intensity of UV light (therefore rate of initiation).

All of these factors may affect one or more of the following: molecular weight, polydispersity, alignment, switching behaviour.

To assess the effect of exposure time to a UV source, experiments were carried out on the following mixture:

91.6 mol % compound II,
8.4 mol % compound I,
0.93% (w/w) Darocur 1173.

The samples were photopolymerised under a Dr. Hönle 400 F metal halide lamp (60–70 mW/cm$^2$). Samples were placed between plain microscope slides and cured at 80° C. as shown in Table 6.

TABLE 6

| Exposure time/min | Mn | Mw | Mw/Mn | % cured |
|---|---|---|---|---|
| 1 | 8580 | 12000 | 1.39 | 97.2 |
| 2 | 10100 | 14300 | 1.42 | 97.9 |
| 5 | 10400 | 15100 | 1.45 | 98.2 |
| 10 | 10300 | 14900 | 1.44 | 98.3 |

The effect of the temperature at which the mixture is cured on the overall percentage of curing was also investigated.

The following mixture was prepared:
91.6 mol % compound II,
8.4 mol % compound I,
0.93% (w/w) Darocur 1173.

The phase behaviour of this monomeric mixture is as follows:

K46° C. $S_C$47° C. $S_A$84° C. I.

The effect of temperature (and therefore phase) on molecular weight of cured polymer was tested using samples between plain slides, cured for 5 minutes under a 400 F lamp.

TABLE 7

| Temperature/° C. | Phase change | Mn | Mw/Mn | % cured |
|---|---|---|---|---|
| 40 | $S_C$–$S_1$ | 10100 | 1.41 | 98.3 |
| 60 | $S_A$–$S_C$ | 10200 | 1.42 | 98.7 |
| 80 | $S_A$–$S_C$ | 10300 | 1.44 | 98.3 |
| 100 | I–$S_C$ | 9900 | 1.46 | 98.1 |
| 120 | I–$S_C$ | 9600 | 1.44 | 98.2 |
| 140 | I–$S_A$ | 9780 | 1.46 | 97.7 |

The result in Table 8 refer to polymerisation of monomer compound III which has a $(CH_2)_{10}$ spacer. Monomer compound III was synthesised in a similar manner to compound II. Table 8 illustrates the effect of molecular weight on phase behaviour of a ferroelectric liquid crystal polymer. Various amounts of the thiol compound I were added to the compound III. In Table 8, LCP is an abbreviation for liquid crystal polymer.

TABLE 8

| LCP | Thiol I | Mn | Mw/Mn | DP | Phase Behaviour/° C. |
|---|---|---|---|---|---|
| 1 | 10.0% | 7170 | 1.39 | 11 | g 20.1 $S_?$ 51.3 $S_C$ 125 $S_A$ 140.0 I |
| 2 | 5.0% | 13700 | 1.38 | 22 | g 27.3 $S_?$ 56.5 $S_C$ 129.3 $S_A$ 148.2 I |
| 3 | 2.5% | 23900 | 1.55 | 36 | g 30.4 $S_?$ 57.2 $S_C$ 136.7 $S_A$ 151.7 I |
| 4 | 1.7% | 29000 | 1.76 | 44 | g 30.9 $S_?$ 58.3 $S_C$ 139.9 $S_A$ 154.7 I |
| 5 | 1.0% | 44900 | 2.08 | 69 | g 29.0 $S_?$ 61.3 $S_C$ 140.8 $S_A$ 158.2 I |
| 6 | 0.0% | | | * | g 40.1 $S_?$ 64.8 $S_C$ 140.9 $S_A$ 159.7 I |

*too large to measure

For those materials described in Table 8 the monomer samples with various amounts of compound I mixed with Darocur 1173 (1% w/w) were flow filled into 2.2 μm cells and polymerised for 2 minutes under Dr. Hönle 400 F UV lamp (metal halide) on a hotplate thermostatted to 60° C. Molecular weight data was obtained by GPC on samples scraped from between glass slides. Phase behaviour was assessed by DSC and optical microscopy.

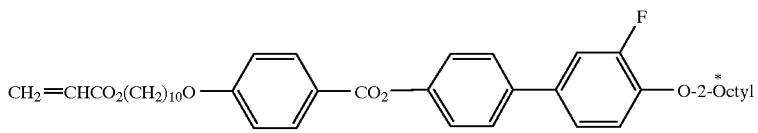

Compound III

The electro-optic behaviour of these polymers was examined under polarising optical microscopy with an applied electric field. The polymers were found to demonstrate ferroelectric switching throughout the smectic C phase and an electroclinic response in the smectic A phase. Table 9 describes the effect of temperature and molecular weight upon the electro-optic response time for these liquid crystal polymers, measured using a photo-diode attached to the polarising microscope whilst applying a square wave field to the samples.

TABLE 9

Optical Response Times/ms for Photopolymerised compound III

| Temp/° C. | DP = 11 | DP = 22 | DP = 36 | DP = 44 | DP = 69 | DP large |
|---|---|---|---|---|---|---|
| 50 | | | | | | |
| 55 | 66 | 2000 | | | | |
| 60 | 33.6 | 660 | | | | |
| 65 | | 220 | 700 | | | |
| 70 | 18.2 | 105 | 340 | 1900 | 24100 | |
| 75 | | | | | 6700 | |
| 80 | 8.9 | 34.7 | 75 | 260 | 1750 | |
| 85 | | | | | | 150000 |
| 90 | 5.3 | 13.5 | 32 | 79 | 290 | 4900 |
| 95 | 4.9 | | | | 220 | |
| 100 | 4.7 | 7.6 | 16 | 21 | 106 | 300 |
| 105 | 4.4 | | | | | |
| 110 | 4 | 5.1 | 6.1 | 11 | 22.2 | 59 |
| 115 | 3.8 | | | | | |
| 120 | 3.5 | 4.6 | 4.6 | 6.0 | 9.7 | 26.8 |
| 125 | 3.4 | 4.2 | 4.5 | | | |
| 130 | 3.2 | 4.0 | 4.1 | 5.5 | 6.8 | 8.4 |
| 135 | 2.5 | | 4.1 | 4.6 | 5.1 | 6.6 |
| 140 | 2.0 | 3.1 | 3.5 | 3.9 | 4.7 | 5.0 |
| 145 | | 2.5 | 2.5 | 2.9 | | 4.9 |
| 150 | | | 2.0 | 2.2 | 2.8 | 3.8 |
| 155 | | | | 2.1 | 2.5 | 2.8 |
| 158 | | | | | | 2.5 |

+/− 10.0 V/μm square wave in 2.2 μm cells

We claim:

1. A method of making an electro-optic device comprising the steps:
   forming a cell comprising two cell walls spaced apart, the walls inner surfaces having formed thereon electrode structures,
   providing a material comprising a free radical polymerizable monomer material and a chain transfer reagent,
   introducing a layer of the material between the cell walls,
   polymerizing the layer of material to form a liquid crystal polymer wherein the chain transfer reagent is a liquid crystal thiol-containing compound.

2. A method according to claim 1 wherein at least one wall is surface treated to provide liquid crystal alignment.

3. A method according to claim 1 wherein the monomer is a liquid crystal material.

4. A method according to claim 1 wherein the layer of material additionally contains a photoinitiator.

5. A method according to claim 1 wherein the polymerisation is carried out under UV light.

6. A method according to claim 5 wherein the polymerisation is carried out with the addition of heat.

7. A method according to claim 1 wherein the layer of material additionally contains a thermal initiator.

8. A method according to claim 7 wherein the polymerisation is carried out in the presence of heat.

9. A method according to claim 1 wherein at least one of the cell walls is flexible.

10. A method of making an electro-optic device comprising the steps:
    forming a cell comprising two cell walls spaced apart, the walls inner surfaces having formed thereon electrode structures, and at least one wall surface treated to provide liquid crystal alignment,
    providing a mixture containing a free radical polymerizable monomer material a photoinitiator and a liquid crystal thiol-containing chain transfer reagent,
    introducing the mixture between the cell walls, and
    polymerizing the mixture in the presence of UV light to form a liquid crystal polymer.

11. A method according to claim 10 wherein the polymerisation is carried out in the presence of additional heat.

12. A method according to claim 10 and comprising the additional step of aligning the monomer material by heating to the isotropic phase and cooling slowly to a liquid crystalline phase.

13. A method according to claim 10 and comprising the additional step of aligning the monomer material by heating to a liquid crystal phase and cooling slowly to another liquid crystalline phase.

14. A method according to claim 10 wherein during the polymerisation process the monomer material is maintained in an aligned state in a liquid crystal phase.

15. A method according to claim 10 wherein during the polymerisation process the monomer material and the chain transfer reagent are maintained in an aligned state in a liquid crystal phase.

16. A method according to claim 12 wherein the monomer is a smectic liquid crystal material.

17. A method of making a thin layer of aligned smectic liquid crystal polymer comprising the steps of:
    forming a cell comprising two cell walls of which at least one of the cell walls is flexible, said cell walls being spaced apart and at least one wall surface treated to provide liquid crystal alignment,
    providing a mixture containing a free radical polymerizable monomer material, a photoinitiator and a liquid crystal thiol-containing chain transfer agent,
    introducing the mixture between the cell walls,
    polymerizing the mixture to form an aligned liquid crystal polymer,
    removing at least one of the cell walls, and thereafter,
    removing the thin layer of aligned smectic liquid crystal polymer from between the cell walls.

18. A method of making a thin layer of aligned liquid crystal polymer comprising the steps of:

forming a cell comprising two cell walls of which at least one of the cell walls is flexible, said cell walls being spaced apart, and at least one wall surface treated to provide liquid crystal alignment, providing a mixture containing a free radical polymerizable monomer material, a photoinitiator and a liquid crystal thiol-containing chain transfer agent, introducing the mixture between the cell walls, polymerizing the mixture in the presence of UV light to form an aligned liquid crystal polymer, removing at least one of the cell walls, and thereafter removing the aligned liquid crystal polymer layer from between the cell walls.

19. A method according to claim 18 wherein the polymer is a smectic liquid crystal polymer.

20. A method of making a piezoelectric or pyroelectric device comprising the steps:

forming a cell comprising two cell walls spaced apart, the walls' inner surfaces having formed thereon electrode structures, providing a material comprising a free radical polymerizable monomer material and a chain transfer reagent, introducing a layer of the material between the cell walls, and polymerizing the layer of material to form a liquid crystal polymer, wherein the chain transfer reagent is a liquid crystal thiol-containing compound.

21. A method of making a piezoelectric or pyroelectric device comprising the steps:

forming a cell comprising two cell walls spaced apart, the walls' inner surfaces having formed thereon electrode structures and at least one wall surface treated to provide liquid crystal alignment, providing a mixture containing free radical polymerizable monomer material, a photoinitiator and a liquid crystal thiol-containing chain transfer reagent, introducing the mixture between the cell walls, and polymerizing the mixture in the presence of UV light to form a liquid crystal polymer.

22. A method according to any of claims 1, 9, 20 and 21 wherein the liquid crystal polymer is aligned by applying a field.

23. A method of making a thin layer of aligned liquid crystal polymer comprising the steps of:

forming a cell comprising two cell walls of which at least one of the cell walls is flexible, said cell walls being spaced apart, providing a mixture of a free radical polymerizable monomer material, and a liquid crystal thiol-containing chain transfer agent, introducing the mixture between the cell walls, polymerizing the mixture to form a liquid crystal polymer, removing at least one of the cell walls, removing an aligned layer from between the cell walls, wherein the liquid crystal polymer is aligned by applying a field before, during and/or after polymerization.

* * * * *